Patented Aug. 28, 1945

2,383,716

UNITED STATES PATENT OFFICE 2,383,716

MANUFACTURE OF FIBROCEMENTITIOUS SHEETS

James Driscoll, Plainfield, N. J., assignor to Johns-Manville Corporation, New York, N. Y., a corporation of New York No Drawing. Application October 30, 1942, Serial No. 463,942

2 Claims. (Cl. 260—41)

This invention relates to the manufacture of oil and heat-resistant fibro-cementitious sheet material suitable for packing and gaskets, in which the cementing or bonding agent is a vulcanized (fully polymerized) polymer of modified butadiene, such as polychloroprene.

The present invention is an improvement on the process of manufacturing sheet packing material which is described in my prior United States Patent No. 2,052,610, granted September 1, 1936, for "Wear and heat resisting composition." According to the descriptions of my aforesaid patent, a mixture of incompletely polymerized chloroprene and asbestos fibres is thoroughly milled and plasticized and then sheeted out to desired thickness on a hot roll sheeter unit. The sheet thus formed is then heat-cured or vulcanized while under pressure, as in a hydraulic press, to densify it and further polymerize to a suitable high tensile strength. The resulting cured sheet is particularly adapted for use as packing and friction material because of its stability and resistance to disintegration when exposed to high temperatures and oil contact, such as would effect rapid weakening and failure of a similar product bonded with natural rubber.

Polychloroprene, as it is used in the manufacture of sheet material such as herein referred to, is an incompletely polymerized chloro.2.butadiene.1,3. Both of such cementing or bonding agents will be generally characterized herein as modified butadiene polymers.

An object of the present invention is to provide an improved heat and oil-resistant gasket sheet material which possesses high tensile strength, together with much greater flexibility and resilience, as compared with heat and oil resistant sheets heretofore available. A more particular object is to provide an improved process for heat curing sheet material which is bonded with polychloroprene, whereby to impart thereto high tensile strength and high flexibility and resilience.

With the above and other objects and features in view, the invention consists in the improved process of manufacturing oil and heat resistant fibro-cementitious sheet material, which is hereinafter described and more particularly defined by the accompanying claims.

The basis of the process of heat curing oil and heat resistant gasket and packing sheets which forms the subject of the present invention, is the discovery that a product of high tensile strength and exceptionally high flexibility and resilience can be produced by simply immersing the formed sheet in a bath of mineral process or lubricating oil for a few minutes while maintaining the temperature of the bath within a preferred range of 250–350° F. The resulting cured product has been found to be fully as resistant to weakening by heat and oil, and possesses at least as high tensile strength, as products of comparable composition heretofore cured under pressure, as in a hydraulic press; and the present product is further characterized by a flexibility and resilience very much greater than possessed by comparable products cured by conventional methods. The conventional methods of curing heretofore employed have involved heating the formed sheet for a pre-determined length of time while applying pressure by means of a hydraulic press, or while the sheets are stacked in piles and held under pressure while vulcanizing in a steam-heated autoclave or in a hot air oven.

The preliminary method of forming the uncured packing and gasket sheet stock in accordance with the present invention, may follow closely the procedure described in my aforesaid United States Patent No. 2,052,610. A suitable cementing agent for the sheet stock is chloro.2.butadiene.1,3, which has been incompletely polymerized to a plastic stage to yield a product which is soluble in solvents such as benzene, carbon terachloride, toluol, xylol, and chloroform.

A selected quantity (for example, 20 parts by weight) of thus-plasticized polychloroprene may be reduced to a plastic cement and thoroughly mixed in a churn or on a conventional rubber mill with pulverulent filler material such as, for example, 10 parts by weight of barium sulphate, 1 part of zinc oxide, and up to 5 parts of carbon black, rosin, organic anti-oxidant, and similar rubber compounding ingredients. When thoroughly mixed, the batch is placed in a rubber cement churn and there is added thereto a suitable amount of a solvent such as benzol. The churn is operated until the batch is reduced to a thin cement. Asbestos fibres, preferably of $\frac{1}{8}''$–$\frac{1}{4}''$ length and which have been well opened and cleaned, are then added slowly to the liquid cement in suitable proportions (for example, 63 parts by weight of the dry components), and the mixture is thoroughly kneaded to effect complete coating of the asbestos fibres and impregnation of the fibre interstices with the cement compound. During the kneading operation, the fibres adsorb the cement, and the mixture is worked up to a plastic dough, in which form it is banked above the bite of two opposed rolls of a sheeting mill. One of the sheeting mill rolls is heated to a temperature of approximately 200° F., and the hot surface of the roll, when contacted with the fibrous cement dough, rapidly volatilizes any benzol or other solvent which is present. Due to the volatilization of the solvent in that portion of the dough in contact with the hot roll, this portion of the dough becomes tacky and strongly adheres to the surface of the hot roll, thereby developing a continuous film or sheet on the rotating surface of the roll. The other roll is preferably cooled by circulation of cold water therethrough, and provision is made for effecting gradual separation of the rolls at their point of tangency as a sheet is built up on the hot roll. A sheet is thus continuously built up by gradually feeding the plastic dough through the bite between the rolls until there is produced an uncured sheet of suitable thickness which may be, for example, 1/64–3/8". This sheet or shaped mass is then cut from the hot roll on which it has been formed and may then be dried to effect complete removal of solvent before it is subjected to the curing operation which represents the improvement of the present invention.

This curing operation comprises immersing the sheet in a bath of mineral process or lubricating oil for a period of only a few minutes (say from 15 minutes to 1 hour, depending on the thickness of the sheet), while maintaining the temperature of the bath preferably within the range 250–350° F. Oils suitable for this purpose are the conventional light and medium lubricating or process oils, having specific gravities in the neighborhood of .90; initial boiling points above 450° F.; and viscosities preferably of 150–450 seconds Saybolt Universal viscosity at 100° F. Oils which are naphthenic in character are preferred over paraffinic oils, although either paraffinic or naphthenic oils give satisfactory results.

Oil and heat-resistant sheets adapted for use as packing and gaskets are thus produced in accordance with the present invention by immersion in a heated oil, without application thereto of pressure in any form, and without exposure to steam, air or other oxidizing atmospheres. After completing the vulcanizing or heat-curing operation by submergence in hot oil for a pre-determined length of time, the cured sheets are completed, ready for use, by simply cooling and removing from their surfaces any oil adhering thereto. The hot oil curing treatment imparts to the cured sheet complete resistance to disintegration or swelling by contact with hot or cold oil, and complete resistance to weakening by exposure to temperatures at least as high as the curing temperature of the sheet. In addition, the cured sheets possess a very high tensile strength (of the order of at least 3000–4000 pounds per square inch); have a smooth and uniform surface appearance; and have a resiliency and flexibility very much greater than comparable sheets which have been cured by conventional methods applying pressures during the vulcanizing operation. Sheet packing cured by the present method has approximately twice the flexibility of packing of the same dimensions and composition which has been cured by conventional methods under pressure. Such flexibility can be measured, for example, by subjecting strips of the cured sheets to torsional strain by twisting until failure. A sheet of 1/32 inch thickness, cured by the present method, is so flexible and tough that it can be folded in multiple flat folds or rolled up in tight rolls without cracking or splitting at the areas of sharp curvature. In its flexibility the product closely resembles sheet rubber products of the same thickness.

Since many variations may be made from the illustrative details given, without departing from the scope of the invention, it is intended that the invention should be limited only by the terms of the claims interpreted as broadly as consistent with novelty over the prior art.

What I claim is:

1. The method of making flexible sheets adapted for use as packing and the like comprising, forming an intimate mixture of solvent reduced thermoplastic polychloroprene binder and asbestos fibers, sheeting out the mixture while heating it to a temperature not substantially exceeding 200° F., thereby removing solvent therefrom by volatilization, and heat curing the binder by immersing the sheet in a bath of mineral oil for a period of at least 15–30 minutes while maintaining such oil at a temperature of 250–350° F.

2. The method of manufacturing flexible, rubberlike products which comprises, forming a solvent reduced mixture of asbestos fibers, thermoplastic polychloroprene binder and rubber compounding ingredients, shaping the mixture while exposing it to a temperature not substantially exceeding 200° F., thereby removing solvent therefrom by volatilization, and heat curing the shaped mixture by immersing it for a period of 15 minutes to 1 hour in a mineral oil bath while maintaining the temperature of said bath within the range of 250–350° F.

JAMES DRISCOLL.